(12) United States Patent
Kimura et al.

(10) Patent No.: US 9,519,204 B2
(45) Date of Patent: Dec. 13, 2016

(54) LIGHT SOURCE APPARATUS USED IN A PROJECTION TYPE IMAGE DISPLAY APPARATUS

(75) Inventors: Nobuyuki Kimura, Yokohama (JP); Koji Hirata, Yokohama (JP); Hidehiro Ikeda, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 472 days.

(21) Appl. No.: 13/309,188

(22) Filed: Dec. 1, 2011

(65) Prior Publication Data

US 2012/0154767 A1    Jun. 21, 2012

(30) Foreign Application Priority Data

Dec. 17, 2010 (JP) .................................. 2010-281142
Dec. 28, 2010 (JP) .................................. 2010-291525
Dec. 28, 2010 (JP) .................................. 2010-291526

(51) Int. Cl.
   *G03B 21/20*     (2006.01)
   *G03B 21/28*     (2006.01)
   *H04N 9/31*      (2006.01)

(52) U.S. Cl.
   CPC ......... *G03B 21/204* (2013.01); *G03B 21/2066* (2013.01); *G03B 21/2073* (2013.01); *G03B 21/28* (2013.01); *H04N 9/315* (2013.01)

(58) Field of Classification Search
   CPC ....... G03B 21/204; G03B 21/14; G03B 21/28; G03B 21/2066; G03B 21/2073; H04N 9/315

(Continued)

(56) References Cited

U.S. PATENT DOCUMENTS 6,234,648 B1   5/2001 Borner et al.
7,040,774 B2 * 5/2006 Beeson et al. ................. 362/84
(Continued)

FOREIGN PATENT DOCUMENTS

CN  101581410 A   11/2009
EP  2 360 523 A1   8/2011
(Continued)

OTHER PUBLICATIONS

European Search Report issued in European Patent Application No. 11 19 0620 dated Feb. 15, 2012.

(Continued)

*Primary Examiner* — Bao-Luan Le
(74) *Attorney, Agent, or Firm* — McDermott Will & Emery LLP

(57) ABSTRACT

A light source apparatus which emits light from phosphor by exciting light and in which an efficiency of brightness is improved is provided. The light source apparatus has a light source which emits exciting light; and a metal member to which the exciting light is input, wherein the metal member has a concave portion in a portion to which the exciting light is input, and phosphor to generate phosphor light from the exciting light is coated in the concave portion. The concave portion may have a taper shape. The phosphor may be coated on at least two surfaces of the concave portion. The phosphor may be coated on an area which is equal to or less than the half of a depth of the concave portion. A glass member having a taper shape may be formed at an opening portion of the concave portion.

2 Claims, 13 Drawing Sheets

(58) Field of Classification Search
USPC .................. 353/38, 94; 362/84, 293
See application file for complete search history.

(56) References Cited

U.S. PATENT DOCUMENTS

| | | | | |
|---|---|---|---|---|
| 7,070,300 | B2* | 7/2006 | Harbers et al. | 362/231 |
| 7,234,820 | B2* | 6/2007 | Harbers et al. | 353/94 |
| 7,494,228 | B2* | 2/2009 | Harbers et al. | 353/94 |
| 8,096,668 | B2* | 1/2012 | Abu-Ageel | 362/84 |
| 8,287,132 | B2* | 10/2012 | Miyamae | G03B 21/204 353/31 |
| 8,462,296 | B2* | 6/2013 | Kimura et al. | 349/71 |
| 2002/0015297 | A1 | 2/2002 | Hayashi et al. | |
| 2004/0233664 | A1* | 11/2004 | Beeson et al. | 362/231 |
| 2005/0185140 | A1* | 8/2005 | Matsubara et al. | 353/20 |
| 2006/0001037 | A1 | 1/2006 | Schardt et al. | |
| 2006/0012842 | A1 | 1/2006 | Abu-Ageel | |
| 2007/0165186 | A1 | 7/2007 | Copner et al. | |
| 2007/0223244 | A1 | 9/2007 | Kurihara et al. | |
| 2008/0094835 | A1 | 4/2008 | Marra et al. | |
| 2008/0198572 | A1 | 8/2008 | Medendorp | |
| 2009/0085047 | A1 | 4/2009 | Livesay et al. | |
| 2009/0284148 | A1 | 11/2009 | Iwanaga | |
| 2010/0046234 | A1* | 2/2010 | Abu-Ageel | 362/308 |
| 2010/0149496 | A1 | 6/2010 | Inoue | |
| 2010/0202129 | A1* | 8/2010 | Abu-Ageel | 362/84 |
| 2010/0328617 | A1* | 12/2010 | Masuda | 353/31 |
| 2011/0043762 | A1* | 2/2011 | Miyamae | G03B 21/204 353/20 |
| 2011/0194038 | A1* | 8/2011 | Kimura et al. | 349/7 |
| 2011/0199580 | A1* | 8/2011 | Hirata et al. | 353/31 |
| 2011/0249242 | A1* | 10/2011 | Saitou et al. | 353/98 |
| 2012/0026721 | A1* | 2/2012 | Kurt et al. | 362/84 |
| 2012/0106126 | A1 | 5/2012 | Nojima et al. | |
| 2013/0038847 | A1* | 2/2013 | Katou | 353/98 |
| 2013/0057833 | A1* | 3/2013 | Katou | 353/31 |
| 2013/0088850 | A1* | 4/2013 | Kroell | 362/84 |

FOREIGN PATENT DOCUMENTS

| | | |
|---|---|---|
| JP | 62-226503 A | 10/1987 |
| JP | 02-152103 A | 6/1990 |
| JP | 2002-008425 A | 1/2002 |
| JP | 2005-191483 A | 7/2005 |
| JP | 2007-029653 A | 2/2007 |
| JP | 2007-188091 | 7/2007 |
| JP | 2007-207615 A | 8/2007 |
| JP | 2007-265627 A | 10/2007 |
| JP | 2007-300138 A | 11/2007 |
| JP | 2009-277516 | 11/2009 |
| JP | 2010-145638 A | 7/2010 |
| JP | 2010-224493 A | 10/2010 |
| JP | 2011-013315 A | 1/2011 |
| JP | 2011-159555 A | 8/2011 |
| JP | 2012-089687 A | 5/2012 |
| JP | 2012098438 A | 5/2012 |

OTHER PUBLICATIONS

Japanese Office Action with partial translation issued in Japanese Application No. 2010-291525 dated Nov. 12, 2013.
Japanese Office Action with partial translation issued in Japanese Application No. 2010-281142 dated Nov. 12, 2013.
Chinese Office Action with partial translation issued in Chinese Application No. 201110399071.X dated Dec. 13, 2013.
Japanese office Action, w/ partial English translation thereof, issued in Japanese Patent Application No. JP 2010-291525 dated Apr. 8, 2014.

* cited by examiner

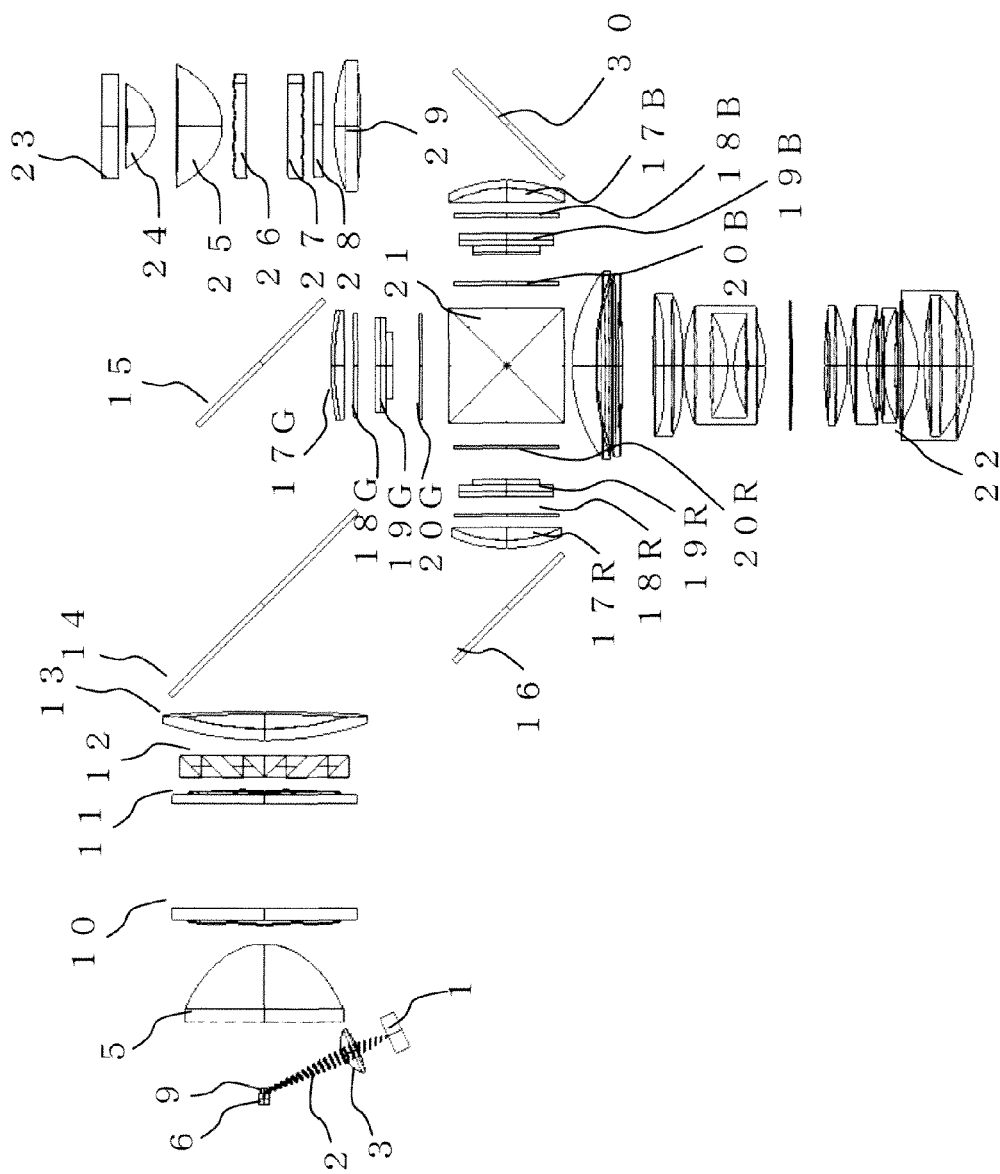

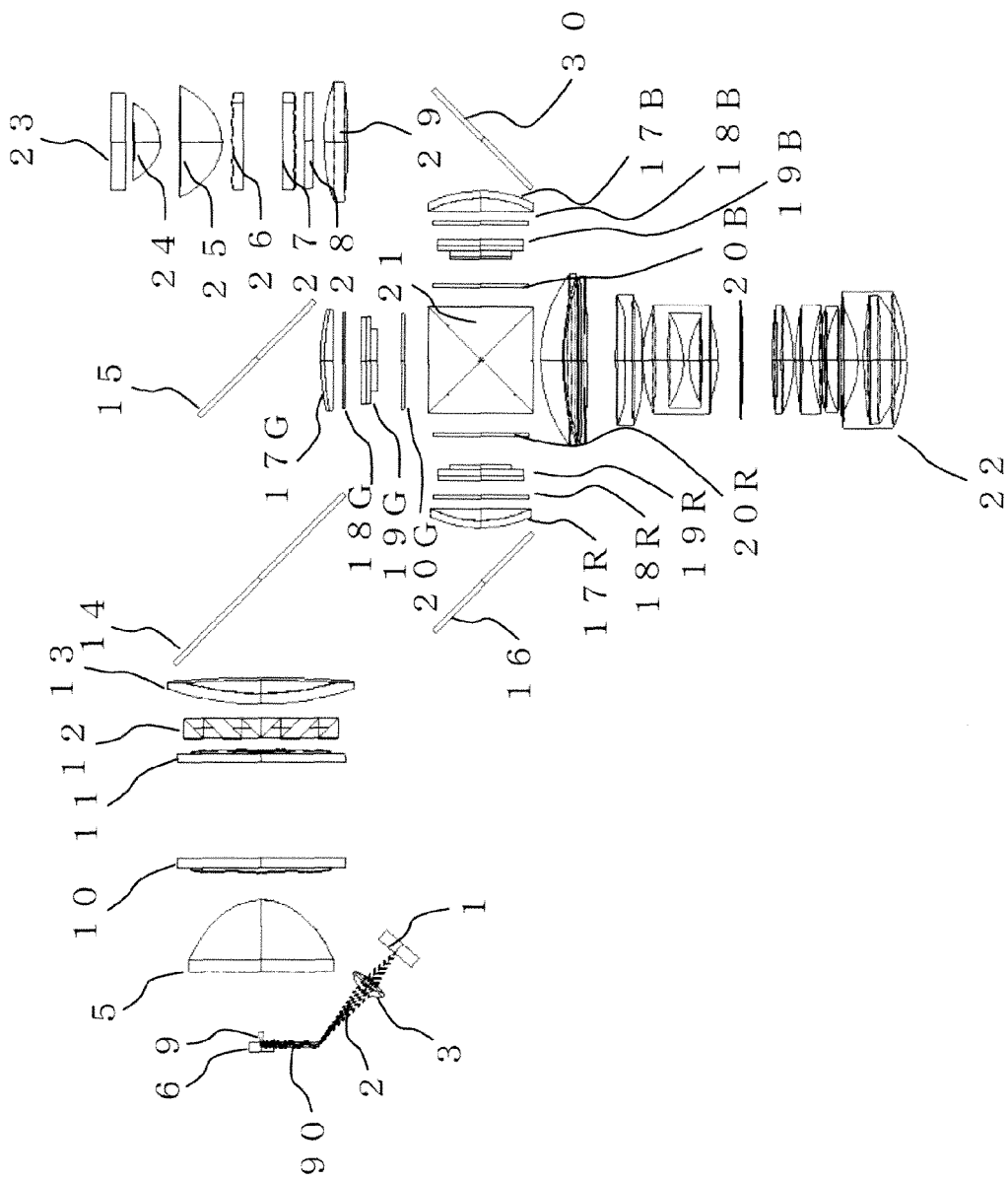

LIGHT SOURCE APPARATUS USED IN A PROJECTION TYPE IMAGE DISPLAY APPARATUS

INCORPORATION BY REFERENCE

The present application claims priority from Japanese applications, JP-2010-281142 filed on Dec. 17, 2010, JP-2010-291526 filed on Dec. 28, 2010, JP-2010-291525 filed on Dec. 28, 2010, the contents of which are hereby incorporated by reference into this application.

BACKGROUND OF THE INVENTION

The invention relates to a light source apparatus which is used in a projection type image display apparatus.

In a projection type image display apparatus in which a display screen of an image display device having a structure in which a plurality of reflection type or transmission type liquid crystal panels and micro mirrors are arranged is enlargedly displayed onto a screen, a board, or the like as a projection surface, an illumination optical system has been devised so that an enlarged image having sufficient size and brightness is obtained on the projection surface. Particularly, a projection type image display apparatus using solid-state light-emitting devices such as light-emitting diodes, organic ELs, or the like of red, green, and blue is being developed.

For example, a light source apparatus in which exciting light which is irradiated from a solid-state light source is also emitted as visible light at a high efficiency has been proposed (refer to JP-A-2009-277516).

SUMMARY OF THE INVENTION

If the invention disclosed in JP-A-2009-277516 is applied, the following problems to be solved are considered. FIG. 13 is a constitutional diagram of the main part of a light source apparatus which is presumed as a problem to be solved. In FIG. 13, exciting light 2 emitted from an exciting light source 1 becomes mostly parallel light by a collimator lens 300 and enters a dichroic mirror 4. The dichroic mirror 4 has such characteristics that it reflects the light of a wavelength band of the exciting light 2 and transmits the light of a wavelength band of phosphor light 8. Therefore, the exciting light 2 is reflected by the dichroic mirror 4, passes through a condenser lens 5, and thereafter, enters a rotation-controllable disk 100 coated with phosphor 7. The curvature of the condenser lens 5 is set so that the incident parallel light is converged to one position on the disk 100. The phosphor 7 which has been excited by the exciting light 2 and coated on the disk 100 emits the phosphor light 8. The phosphor light 8 passes through the condenser lens 5, thereafter, becomes mostly parallel light, is transmitted through the dichroic mirror 4, and enters an illumination optical system at the post stage. Since the phosphor light emitted from the phosphor 7 is output in every direction, phosphor light 800 which cannot be captured by the condenser lens 5 exists. Since non-conversion exciting light 200 which is not converted into the phosphor light also exists, this results in a decrease in light using efficiency.

It is, therefore, an object of the invention to provide a light source apparatus in which brightness efficiency is improved in a light source apparatus in which phosphor is made to emit light by exciting light.

To solve the above problems, the invention provides, for example, following desired embodiments.

A light source apparatus comprises: a light source which emits exciting light; and a metal member to which the exciting light is input, wherein the metal member has a concave portion in a portion to which the exciting light is input, and phosphor to generate phosphor light by exciting the exciting light is coated in the concave portion.

A transmission member having a taper-shaped space is formed at an opening portion of the concave portion, and a dichroic coating having such characteristics that it transmits light of a wavelength band of the exciting light and reflects light of a wavelength band of the phosphor light may be evaporated on the taper-shaped portion of the transmission member.

The metal member has a notched portion in the portion to which the exciting light is input, the phosphor to form the phosphor light from the exciting light is coated in the notched portion, and an optical device to guide the exciting light to the phosphor may be arranged at the opening portion of one plane in the notched portion which the exciting light enters.

Other objects, features and advantages of the invention will become apparent from the following description of the embodiments of the invention taken in conjunction with the accompanying drawings.

BRIEF DESCRIPTION OF THE DRAWINGS

FIG. 6 is a diagram illustrating an optical system of a projection type image display apparatus in Embodiment 3;

FIG. 8 is a diagram illustrating an optical system of a projection type image display apparatus in Embodiment 4;

DETAILED DESCRIPTION OF THE EMBODIMENTS

Figure 1A:
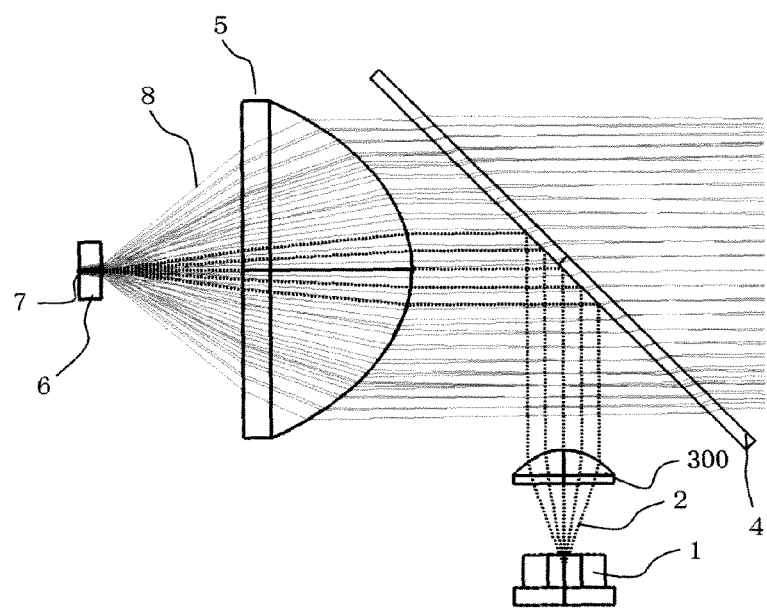
FIGS. 1A to 1C are constitutional diagrams of the main parts of a light source apparatus in Embodiment 1.

Embodiments will be described hereinbelow with reference to the drawings. In the diagrams, the same portions are designated by the same reference numerals and their repetitive description is omitted. When elements arranged on an optical path of light of each color are distinguished, R, G, or B showing the color light is added as a suffix after each reference numeral. If there is no need to distinguish them, each suffix of the color light is omitted.

[Embodiment 1]

Figure 1B:
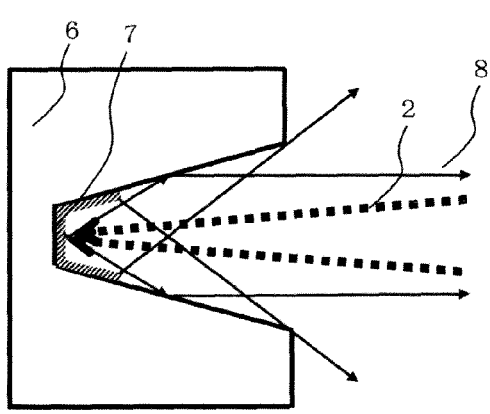
Figure 1C:
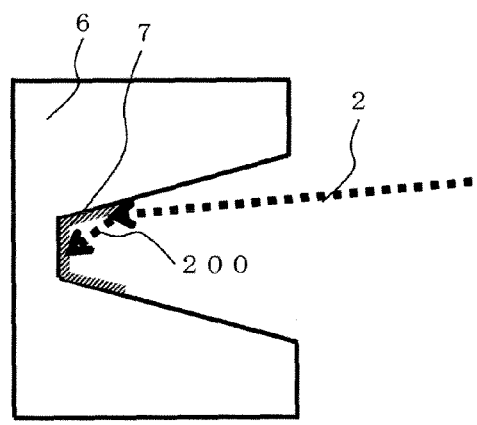

FIGS. 1A to 1C are constitutional diagrams of a main part of a light source apparatus in Embodiment 1.

FIG. 1A illustrates a whole constitution of an optical system. The exciting light 2 irradiated from an exciting light source 1 becomes mostly parallel light by a collimator lens 300 and enters a dichroic mirror 4. Since the dichroic mirror 4 has such characteristics as mentioned above, the exciting light 2 is reflected by the dichroic mirror 4, passes through a condenser lens 5, and thereafter, enters a metal member 6. The metal member has a concave portion in a portion to which the exciting light is input. A phosphor 7 to form phosphor light 8 from the exciting light is coated onto the concave portion. The concave portion has such a taper shape that an outgoing side opening portion of the phosphor light 8 is larger than an incident side opening portion.

Figure 13:
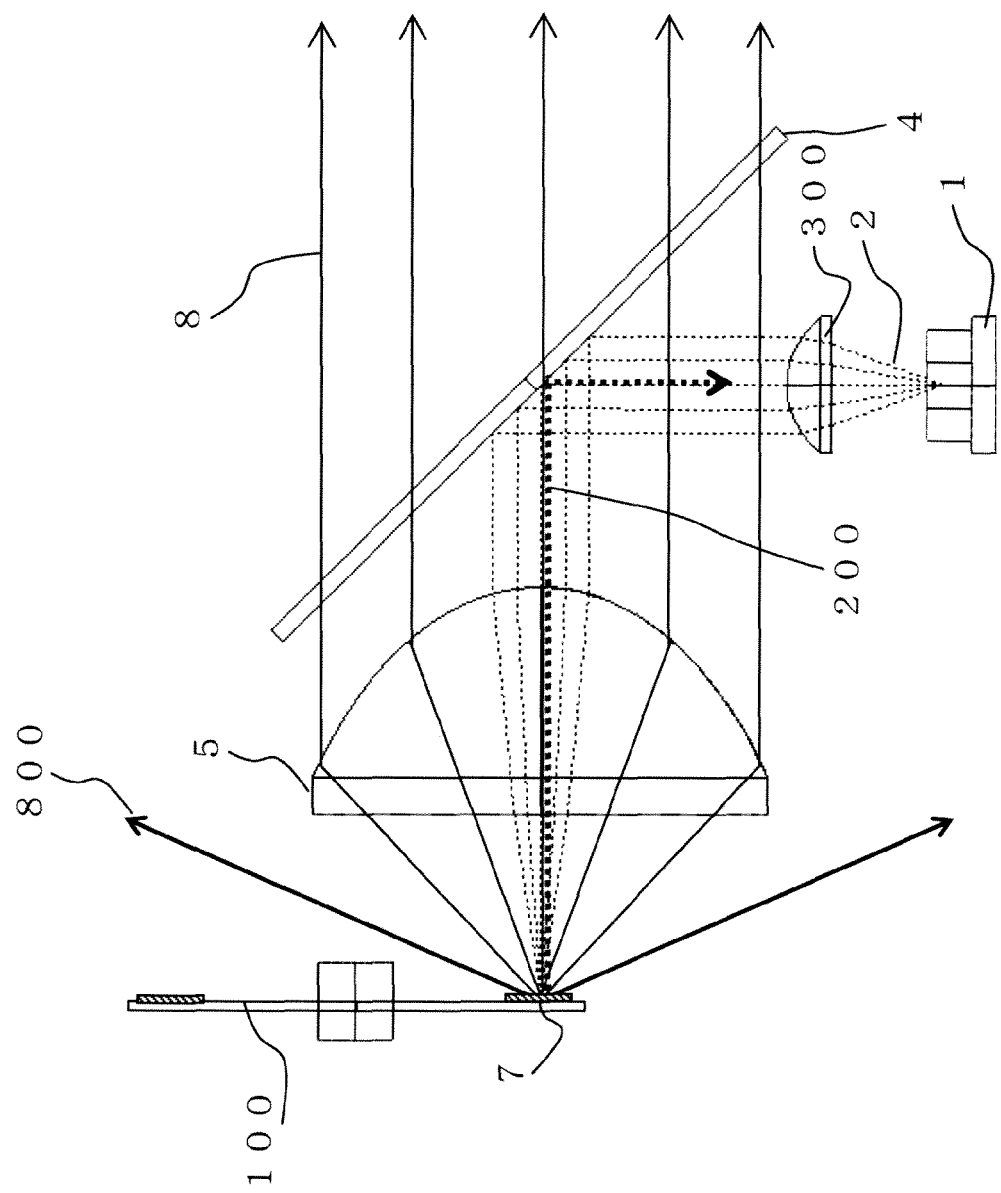
FIG. 13 is a constitutional diagram the main parts of a light source apparatus which is presumed as a problem.

In FIG. 13, since an organic silicon resin or the like is used as a binder adapted to disperse and solidify the phosphor, it is necessary to rotate it in order to prevent a burning that is caused by a temperature. However, by using an inorganic binder, the rotation of the phosphor is unnecessary. The phosphor light 8 emitted from the phosphor 7 passes through the condenser lens 5, thereafter, becomes mostly parallel light, passes through the dichroic mirror 4, and enters an illumination optical system at the post stage.

FIG. 1B is an enlarged diagram of the metal member 6 and shows divergent rays of the phosphor light 8. The phosphor light 8 emitted from the phosphor 7 is reflected by the taper portion of the metal member 6 so that the phosphor light 8 does not diverge in every direction but is converged to a divergence of a predetermined angle in the opening portion of the metal member 6. All of the phosphor light 8 can be captured by the condenser lens 5. In order to reduce the angle of the phosphor light 8 which is not reflected by the taper portion but diverges directly to the outside of the metal member 6, it is desirable that an area where the phosphor is coated to the taper portion is limited to an area deeper than the half of the depth of concave portion.

FIG. 1C is an enlarged diagram of the metal member 6 and shows a light beam of the exciting light 2. In the exciting light 2 which entered the phosphor 7, a non-conversion exciting light 200 which is not converted into the phosphor light is reflected by the phosphor 7, again enters the phosphor 7 coated to another portion, and is converted into the phosphor light 8. Therefore, it is desirable that the phosphor is coated to at least two surfaces of the taper portion. Even if the exciting light 2 entered the two surfaces of the phosphor 7, the exciting light which is not converted into the phosphor light 8 exists. However, since the probability of such a situation is low, there is hardly a problem.

Figure 2:
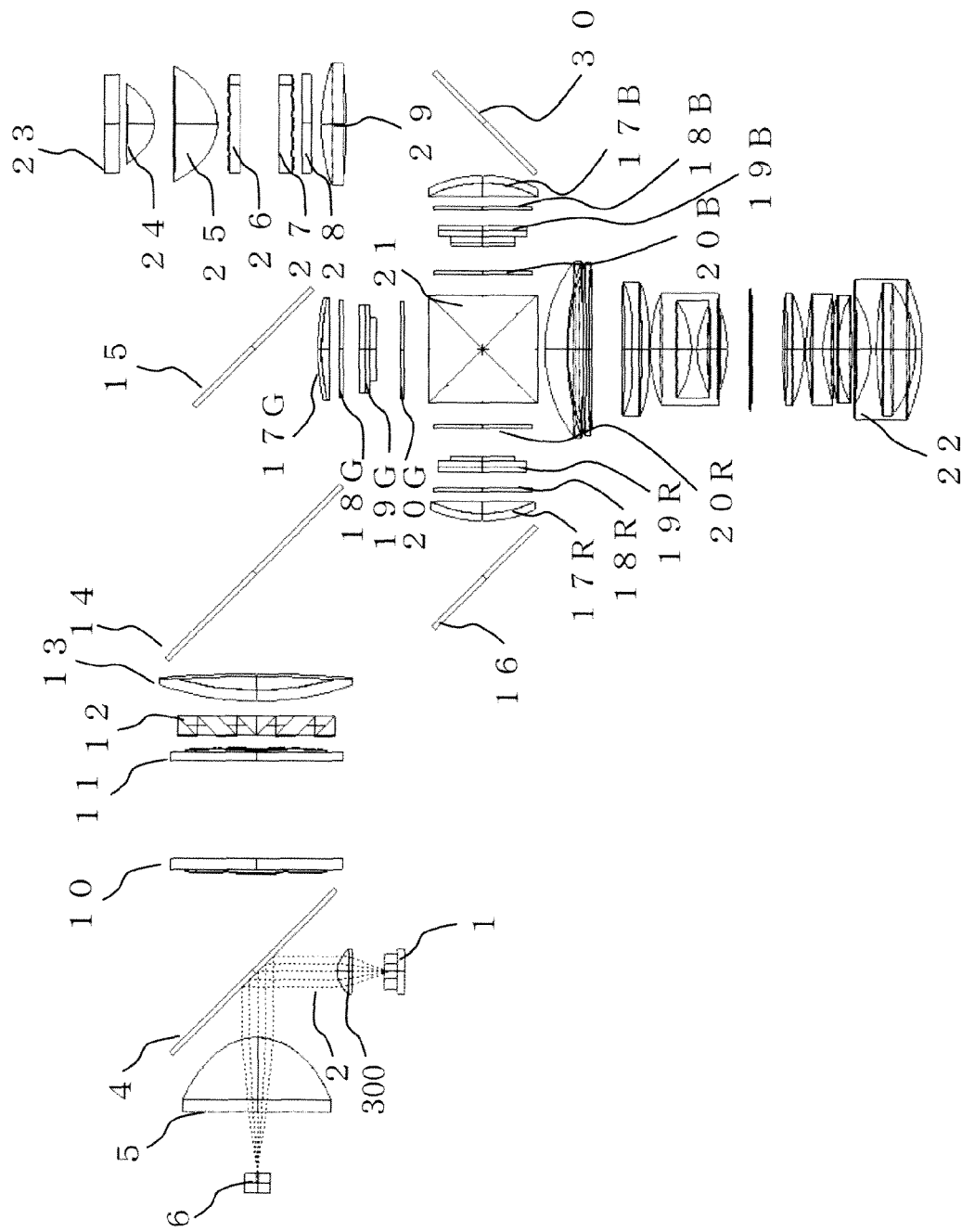
FIG. 2 is a diagram illustrating an optical system of a projection type image display apparatus in Embodiment 1.

FIG. 2 is a diagram illustrating an optical system of a projection type image display apparatus including the light source apparatus of FIG. 1. First, the principle in which red light and green light are irradiated to liquid crystal type image display devices 19R and 19G at a uniform illuminance will be described.

A blue laser is used as an exciting light source 1. This is because, as for the laser, since the light-emitting area of the light-emitting source is small, it is easy to converge and collimate the light. The exciting light 2 emitted from the exciting light source 1 enters the dichroic mirror 4 as mentioned above. The dichroic mirror 4 has such characteristics that it reflects blue light and transmits yellow light (green light and red light). Therefore, the blue exciting light 2 is reflected by the dichroic mirror 4, is transmitted through the condenser lens 5, and is converged to the metal member 6 coated with yellow phosphor (not shown).

The yellow phosphor light caused by exciting the yellow phosphor is emitted from the metal member 6, thereafter, passes through the condenser lens 5, becomes mostly parallel, passes through the dichroic mirror 4, and enters a polarization conversion integrator.

The polarization conversion integrator includes: an optical integrator which is constituted by a first lens group 10 and a second lens group 11 and performs a uniform illumination; and a polarization converting device 12 of a polarization beam splitter array for aligning the polarizing directions of the light to a predetermined polarizing direction and converting into linear polarized light.

The light from the second lens group 11 is mostly aligned to the predetermined polarizing direction, for example, to Y polarized light of the linear polarized light by the polarization converting device 12. Projection images of lens cells of the first lens group 10 are overlaid onto the liquid crystal type image display devices 19R and 19G by a condenser lens 13 and collimator lenses 17R and 17G, respectively.

At this time, the yellow phosphor light which passed through the condenser lens 13 is separated into red light and green light by a dichroic mirror 14. Since the dichroic mirror 14 has such characteristics that it transmits the green light and reflects the red light, in the yellow light which entered the dichroic mirror 14, the green light passes through the dichroic mirror 14, is reflected by a reflecting mirror 15, and becomes mostly parallel by the collimator lens 17G. X polarized light is eliminated by an incident side polarizing plate 18G and, thereafter, the green light enters the liquid crystal type image display device 19G. On the other hand, the red light is reflected by the dichroic mirror 14, is reflected by a reflecting mirror 16, and becomes mostly parallel by the collimator lens 17R. X polarized light is eliminated by an incident side polarizing plate 18R and, thereafter, the red light enters the liquid crystal type image display device 19R.

Subsequently, the principle in which blue light is irradiated to a liquid crystal type image display device 19B at a uniform illuminance will be described.

A light source 23 is a blue light source and is, for example, an LED light source. Blue light emitted from the light source 23 passes through collimator lenses 24 and 25, becomes mostly parallel, and enters a polarization conversion integrator for the blue light.

The polarization conversion integrator for blue light includes: an optical integrator which is composed of a third lens group 26 and a fourth lens group 27 and performs a uniform illumination; and a polarization converting device 28 of a polarization beam splitter array for aligning the polarizing directions of the light to a predetermined polarizing direction and converting into linear polarized light. The light from the fourth lens group 27 is mostly aligned to the predetermined polarizing direction, for example, to Y polarized light of the linear polarized light by the polarization converting device 28. Projection images of lens cells of the third lens group 26 are overlaid onto the liquid crystal type image display device 19B by a condenser lens 29, a reflecting mirror 30, and a collimator lens 17B, respectively. At this time, the X polarized light is eliminated by an incident side polarizing plate 18B.

Subsequently, the polarization degree of each liquid crystal type image display device 19 (19R, 19G, 19B) constituting a light intensity modulating unit is raised by the incident side polarizing plate 18 (18R, 18G, 18B) in which the Y direction is set to a transmission axis. The light intensity modulating unit performs a light intensity modulation in accordance with a color image signal (not shown) and forms an optical image of the X polarization of each color light.

The optical image of the X polarization of each color light formed as mentioned above enters outgoing side polarizing plates 20 (20R, 20G, 20B). The outgoing side polarizing plates 20R, 20G and 20B are polarizing plates in which the X direction is set to a transmission axis. Thus, unnecessary polarized light component (in this instance, the Y polarized light) is eliminated and a contrast is raised.

The optical image of the Y polarization of each color light formed as mentioned above enters a color synthesizing prism 21 serving as a color synthesizing means. At this time, the optical image of the green light enters as X polarization (P polarization to a dichroic film surface of the color synthesizing prism 21) as it is. On the other hand, in a blue optical path and a red optical path, a ½λ (wavelength) plate (not shown) is provided between each of the outgoing side polarizing plates 20B and 20R and the color synthesizing prism 21. Therefore, the optical images of the blue light and the red light of X polarization are converted into optical images of Y polarization (S polarization to the dichroic film surface of the color synthesizing prism 21 where the color synthesis is performed) and, thereafter, enter the color synthesizing prism 21. This is because by performing what is called the SPS synthesis in which the green light is set to the P polarized light and the red light and the blue light are set to the S polarized light in consideration of spectral characteristics of the dichroic film, it is intended to efficiently perform the color synthesis.

Subsequently, the color synthesizing prism 21 is constituted in such a manner that the dichroic film (dielectric multilayer film) for reflecting blue light and the dichroic film (dielectric multilayer film) for reflecting red light are formed on interfaces of four rectangular prisms in an almost X-character shape (cross shape). The blue light and the red light (S polarization to the dichroic film surface) which entered opposite incident planes among three incident planes of the color synthesizing prism 21 are respectively reflected by the dichroic film for the blue light and the dichroic film for the red light which cross each other. The green light (P polarization to the dichroic film surface) which entered the center incident plane goes straight. The optical images of the respective color light are synthesized and color image light (synthesized light) is emitted from an outgoing plane.

The synthesized light emitted from the color synthesizing prism 21 is projected onto a screen (not shown) of a transmission type or a projection type by a projecting lens 22 like, for example, a zoom lens, thereby displaying an enlargedly projected image.

[Embodiment 2]

FIGS. 3A to 3D are constitutional diagrams of a main part of an optical system of a light source apparatus in Embodiment 2.

Figure 3A:
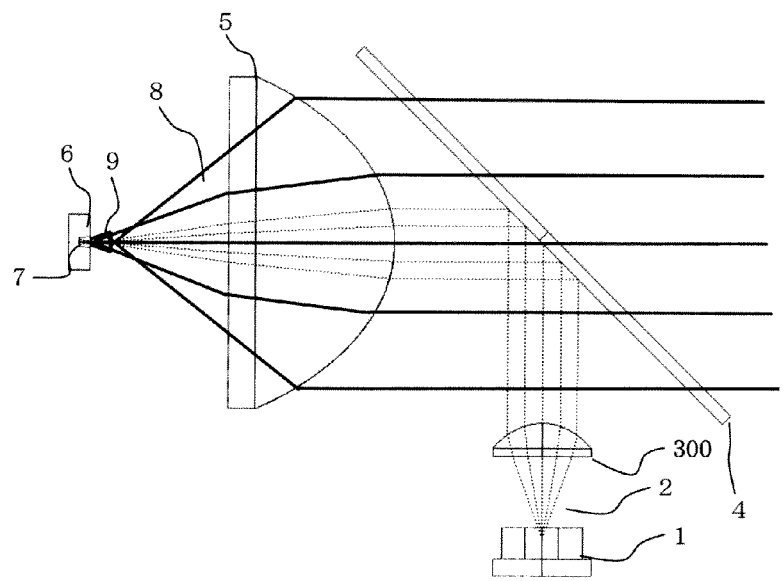
FIGS. 3A to 3C are constitutional diagrams of the main parts of a light source apparatus in Embodiment 2.

FIG. 3A illustrates a whole constitution of the optical system and mainly differs from Embodiment 1 with respect to the point that a rod lens 9 is arranged between the condenser lens 5 and the metal member 6.

Figure 3B:
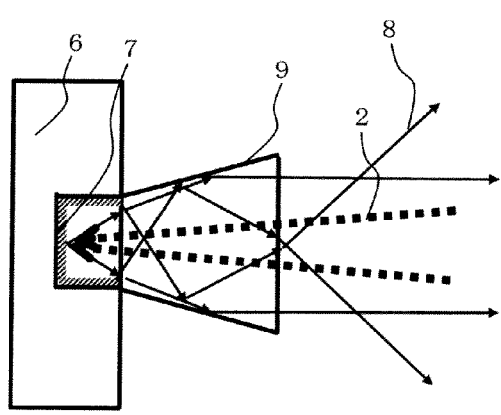

FIG. 3B is an enlarged diagram of the metal member 6 and the rod lens 9 serving as a glass member and shows divergent rays of the phosphor light 8. The phosphor light 8 emitted from the phosphor 7 enters the rod lens 9. The rod lens 9 has such a taper shape that an outgoing side opening portion of the phosphor light 8 is larger than an incident side opening portion. Therefore, after the phosphor light 8 entered the rod lens 9, the phosphor light 8 repeats total reflection in the taper portion, so that the phosphor light does not diverge in every direction but is converged to the divergence of a predetermined angle in an outgoing opening portion of the rod lens 9. Thus, all of the phosphor light 8 can be captured by the condenser lens 5.

Figure 3C:
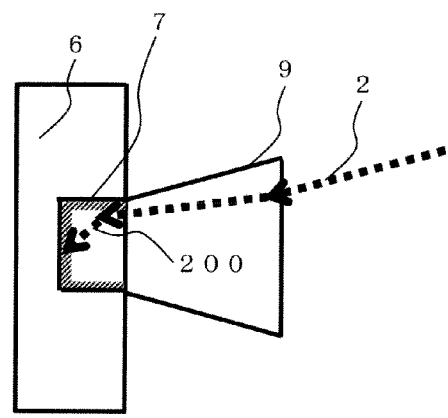

FIG. 3C is an enlarged diagram of the metal member 6 and the rod lens 9 and shows divergent rays of the exciting light 2. In a manner similar to FIG. 1C, the non-conversion exciting light 200 is reflected by the phosphor 7, enters again the phosphor 7 coated to another portion, and is converted into the phosphor light 8. Therefore, it is desirable that the phosphor is coated on at least two surfaces of a concave portion. Even if the exciting light 2 entered the two surfaces of the phosphor 7, exciting light which is not converted into the phosphor light 8 exists. However, since the probability of such a situation is low, there is hardly a problem.

Figure 4:
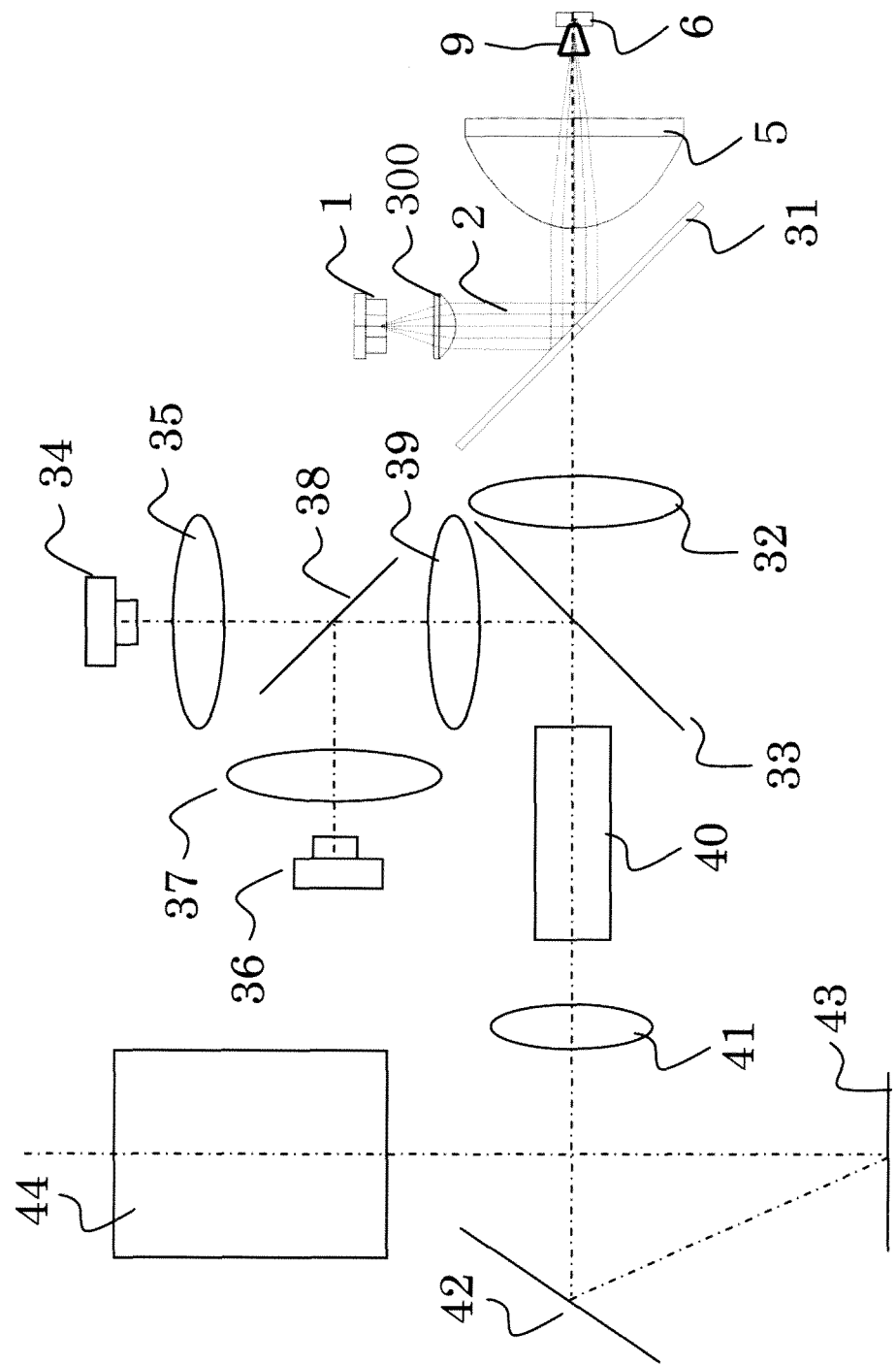
FIG. 4 is a diagram illustrating an optical system of a projection type image display apparatus in Embodiment 2.

FIG. 4 is a diagram illustrating an optical system of a projection type image display apparatus including the light source apparatus of FIG. 2.

The blue exciting light 2 emitted from the exciting light source 1 becomes mostly parallel by the collimator lens 300 and enters a dichroic mirror 31. The dichroic mirror 31 has such characteristics that it reflects blue light and transmits green light. Therefore, the blue exciting light is reflected by the dichroic mirror 31, is converged by the condenser lens 5, passes through the rod lens 9, and thereafter, enters the metal member 6 coated with the green phosphor (not shown).

The green phosphor light caused by exciting the blue phosphor passes through the condenser lens 5, becomes mostly parallel, passes through the dichroic mirror 31, passes through a condenser lens 32, and enters a dichroic mirror 33. The dichroic mirror 33 has such characteristics that it transmits green light and reflects red light and blue light. Therefore, the blue light passes through the dichroic mirror 33 and enters a multiple reflecting device 40. The curvature of the condenser lens 32 is set so that the mostly parallel light which entered is converged to an incident opening portion of the multiple reflecting device 40.

A light source 34 is a red light source and is, for example, an LED light source. The red light emitted from the light source 34 becomes parallel by a collimator lens 35, and enters a dichroic mirror 38. The dichroic mirror 38 has such characteristics that it transmits the red light and reflects the blue light. Therefore, the red light passes through the dichroic mirror 38, passes through a condenser lens 39, and enters the dichroic mirror 33.

On the other hand, a light source 36 is a blue light source and is, for example, an LED light source. The blue light emitted from the light source 36 becomes parallel by a collimator lens 37 and enters the dichroic mirror 38. The dichroic mirror 38 has such characteristics that it transmits red light and reflects blue light. Therefore, the blue light is reflected by the dichroic mirror 38, passes through the condenser lens 39, and enters the dichroic mirror 33. The dichroic mirror 33 has such characteristics that it transmits green light and reflects red light and blue light. Therefore, the red light and the blue light which entered the dichroic mirror 33 are reflected by the dichroic mirror 33 and enter the multiple reflecting device 40.

The curvature of the condenser lens 39 is set so that the mostly parallel light which entered is converged to an incident opening portion of the multiple reflecting device 40. The red light, green light, and blue light which entered the multiple reflecting device 40 are reflected a plurality of times by the multiple reflecting device 40 and become light having a uniform illuminance distribution on an outgoing opening surface of the multiple reflecting device 40. The shape of the outgoing opening surface of the multiple reflecting device 40 is almost similar to that of a DMD (Digital Mirror Device) device 43. The curvature of a condenser lens 41 is set so that an image formed on the outgoing opening surface of the multiple reflecting device 40 is enlargedly formed on the DMD device 43. Therefore, the red light, green light, and blue light emitted from the outgoing opening surface of the multiple reflecting device 40 pass through the condenser lens 41, are reflected by a reflecting mirror 42, and thereafter, are irradiated onto the DMD device 43 at the uniform illuminance distribution.

The exciting light source 1, light source 34, and light source 36 are solid-state light-emitting devices of a high response speed and can be time-divisionally controlled. Therefore, each color light is time-divisionally modulated every color light by the DMD device 43. Each color light reflected by the DMD device 43 enters a projecting lens 44 and is enlargedly projected onto a screen (not shown).

[Embodiment 3]

FIGS. 5A to 5D are constitutional diagrams of the main part of a light source apparatus in Embodiment 3.

Figure 5A:
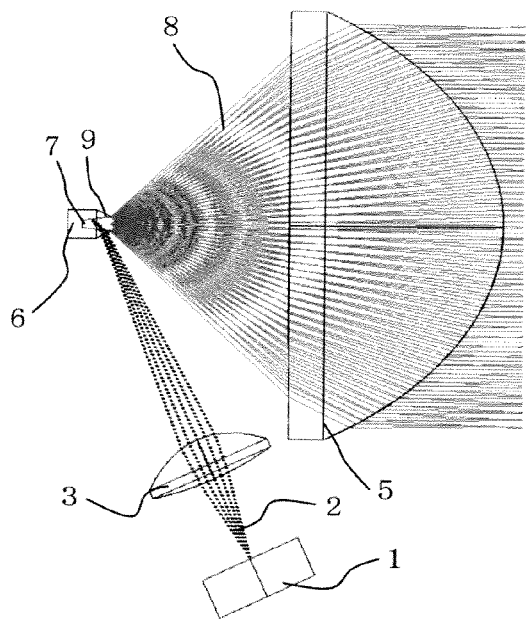
FIGS. 5A to 5D are constitutional diagrams of the main parts of a light source apparatus in Embodiment 3.

FIG. 5A illustrates a whole constitution of an optical system. The exciting light 2 emitted from the exciting light source 1 passes through a transmission member 9 through a condenser lens 3 and, thereafter, enters the metal member 6. The metal member 6 has a concave portion in a portion to which the exciting light is input, and the phosphor 7 to form the phosphor light from the exciting light is coated in the concave portion. The concave portion has such a taper shape as to be enlarged from the back toward an opening portion.

In FIG. 13, since the organic silicon resin or the like is used as a binder adapted to disperse and solidify the phosphor, it is necessary to rotate it in order to prevent burning that is caused by temperature. However, by using the inorganic binder, the rotation of the phosphor is unnecessary.

The phosphor light 8 emitted from the phosphor 7 repeats reflection in the taper portion of the transmission member 9, is converged to a predetermined divergence angle, passes through the condenser lens 5, thereafter, becomes mostly parallel light, and enters the illumination optical system at the post stage.

Figure 5D:
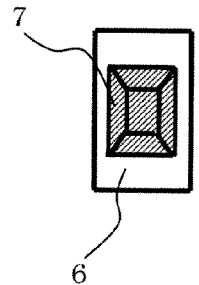
Figure 5B:
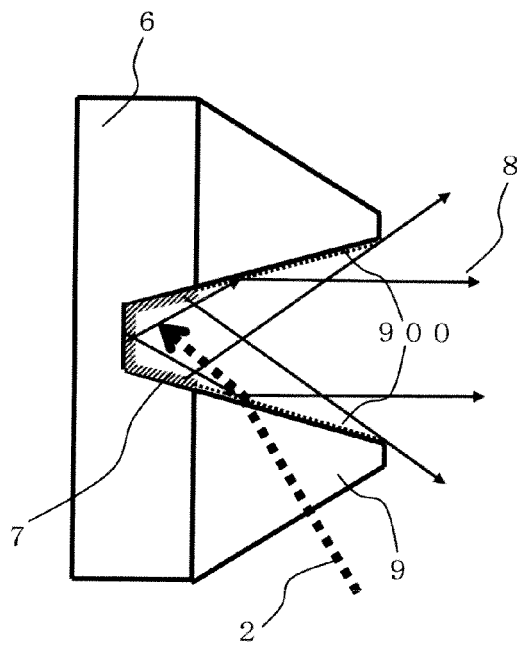

FIG. 5B is an enlarged diagram of the metal member 6 and the transmission member 9 and shows divergent rays of the phosphor light 8. A dichroic coating 900 having such characteristics that it transmits the light of the wavelength band of the exciting light 2 and reflects the light of the wavelength band of the phosphor light 8 has been evaporated on the taper portion in the transmission member 9. Therefore, the exciting light 2 passes through the taper portion of the transmission member 9 and enters the phosphor 7. Since the phosphor light 8 emitted from the phosphor 7 is reflected by the taper portion in the transmission member 9, the phosphor light 8 does not diverge in every direction but is converged to the divergence of the predetermined angle in the opening portion of the transmission member 9.

Figure 5C:
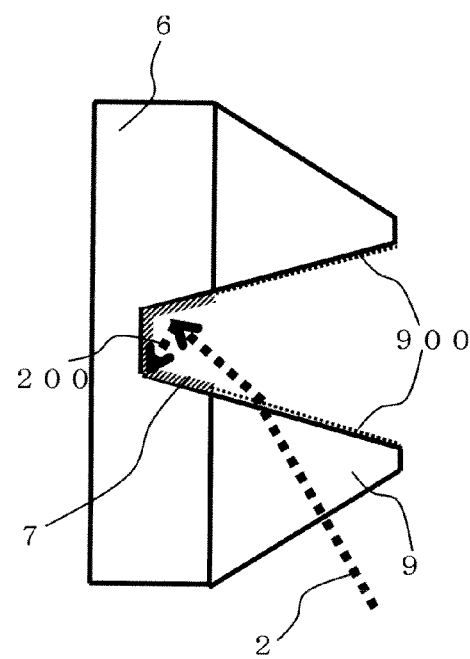

FIG. 5C is an enlarged diagram of the metal member 6 and the transmission member 9 and shows a light beam of the exciting light 2. In the exciting light 2 which entered the phosphor 7, the non-conversion exciting light 200 which is not converted into the phosphor light is reflected by the phosphor 7, enters again the phosphor 7 coated to another portion, and is converted into the phosphor light 8.

FIG. 5D is a front view of the metal member 6. In this instance, the phosphor is coated to five surfaces of the concave portion.

It is desirable that the phosphor 7 is coated on at least two surfaces among the five surfaces of the concave portion.

This is because if the exciting light 2 entered the two surfaces of the phosphor 7, most of the exciting light is converted into the phosphor light. However, if the number of surfaces which are coated with the phosphor is increased to 3, 4, or 5, the exciting light can be converted into the phosphor light more certainly.

FIG. 6 is a diagram illustrating an optical system of a projection type image display apparatus including the light source apparatus of FIG. 5. First, the principle in which red light and green light are irradiated to the liquid crystal type image display devices 19R and 19G at a uniform illuminance will be described.

The blue laser is used as an exciting light source 1. This is because, as for the laser, since the light-emitting area of the light-emitting source is small, it is easy to converge and collimate the light. The blue exciting light 2 emitted from the exciting light source 1 passes through the transmission member 9 as mentioned above, thereafter, enters the yellow phosphor (not shown) coated to the concave portion of the metal member 6, and is converted into the yellow phosphor light. A dichroic coating having such characteristics that it reflects the blue light and transmits the yellow light (green light and red light) has been evaporated on the taper portion in the transmission member 9. Therefore, the yellow phosphor light caused by exciting the yellow phosphor repeats reflection in the transmission member 9 and its divergence angle is reduced. After that, the yellow phosphor light passes through the condenser lens 5, becomes mostly parallel, and enters the polarization conversion integrator.

The polarization conversion integrator includes: an optical integrator which is constituted by the first lens group 10 and the second lens group 11 and performs a uniform illumination; and the polarization converting device 12 of the polarization beam splitter array for aligning the polarizing directions of light to a predetermined polarizing direction and converting into linear polarized light.

The light from the second lens group 11 is mostly aligned to the predetermined polarizing direction, for example, to the Y polarized light of the linear polarized light by the polarization converting device 12. The projection images of the lens cells of the first lens group 10 are overlaid onto the liquid crystal type image display devices 19R and 19G by the condenser lens 13 and the collimator lenses 17R and 17G, respectively. At this time, the yellow phosphor light which passed through the condenser lens 13 is separated into the red light and the green light by the dichroic mirror 14.

Since the dichroic mirror 14 has such characteristics that it transmits the green light and reflects the red light, in the yellow light which entered the dichroic mirror 14, the green light passes through the dichroic mirror 14, is reflected by the reflecting mirror 15, and becomes mostly parallel by the collimator lens 17G. The X polarized light is eliminated by the incident side polarizing plate 18G and, thereafter, the green light enters the liquid crystal type image display device 19G. On the other hand, the red light is reflected by the dichroic mirror 14, is reflected by the reflecting mirror 16, and becomes mostly parallel by the collimator lens 17R. The X polarized light is eliminated by the incident side polarizing plate 18R and, thereafter, the red light enters the liquid crystal type image display device 19R.

Subsequently, the principle in which blue light is irradiated to the liquid crystal type image display device 19B at a uniform illuminance will be described.

The light source 23 is a blue light source and is, for example, the LED light source. The blue light emitted from the light source 23 passes through the collimator lenses 24 and 25, becomes mostly parallel, and enters the polarization conversion integrator for the blue light.

The polarization conversion integrator includes: the optical integrator which is constituted by the third lens group 26 and the fourth lens group 27 and performs a uniform illumination; and the polarization converting device 28 of the polarization beam splitter array for aligning the polarizing directions of light to a predetermined polarizing direction and converting into linear polarized light. The light from the fourth lens group 27 is mostly aligned to the predetermined polarizing direction, for example, to the Y polarized light of the linear polarized light by the polarization converting device 28. The projection images of the lens cells of the third lens group 26 are overlaid onto the liquid crystal type image display device 19B by the condenser lens 29, reflecting mirror 30, and collimator lens 17B, respectively. At this time, the X polarized light is eliminated by the incident side polarizing plate 18B.

Subsequently, the polarization degree of each liquid crystal type image display device 19 (19R, 19G, 19B) constituting the light intensity modulating unit is raised by the incident side polarizing plate 18 (18R, 18G 18B) in which the Y direction is set to the transmission axis. The light intensity modulating unit performs light intensity modulation in accordance with the color image signal (not shown) and forms an optical image of the X polarization of each color light.

The optical image of the X polarization of each color light formed as mentioned above enters outgoing side polarizing plates 20 (20R, 20G, 20B). The outgoing side polarizing plates 20R, 20G, and 20B are polarizing plates in which the X direction is set to the transmission axis. Thus, the unnecessary polarized light component (in this instance, the Y polarized light) is eliminated and the contrast is raised.

The optical image of the Y polarization of each color light formed as mentioned above enters the color synthesizing prism 21 as color synthesizing means. At this time, the optical image of the green light enters as X polarization (P polarization to the dichroic film surface of the color synthesizing prism 21) as it is. On the other hand, in the blue optical path and the red optical path, a ½λ plate (not shown) is provided between each of the outgoing side polarizing plate 20B and 20R and the color synthesizing prism 21. Therefore, the optical images of the blue light and the red light of the X polarization are converted into the optical images of the Y polarization (S polarization to the dichroic film surface of the color synthesizing prism 21 where the color synthesis is performed) and, thereafter, enter the color synthesizing prism 21, respectively. This is because by performing what is called the SPS synthesis in which the green light is set to the P polarized light and the red light and the blue light are set to the S polarized light in consideration of the spectral characteristics of the dichroic film, it is intended to efficiently perform the color synthesis.

Subsequently, the color synthesizing prism 21 is constituted in such a manner that the dichroic film (dielectric multilayer film) for reflecting blue light and the dichroic film (dielectric multilayer film) for reflecting red light are formed on the interfaces of the four rectangular prisms in the almost X-character shape (cross shape). The blue light and the red light (S polarization to the dichroic film surface) which entered the opposite incident planes among the three incident planes of the color synthesizing prism 21 are respectively reflected by the dichroic film for the blue light and the dichroic film for the red light which cross each other. The green light (P polarization to the dichroic film surface) which entered the center incident plane goes straight. The optical images of the respective color light are synthesized, so that color image light (synthesized light) is emitted from the outgoing plane.

The synthesized light emitted from the color synthesizing prism 21 is projected on a screen (not shown) of the transmission type or the projection type by a projecting lens 22 like, for example, a zoom lens, thereby displaying the enlargedly projected image.

[Embodiment 4]

FIGS. 7A to 7D are constitutional diagrams of the main part of a light source apparatus in Embodiment 4.

Figure 7A:
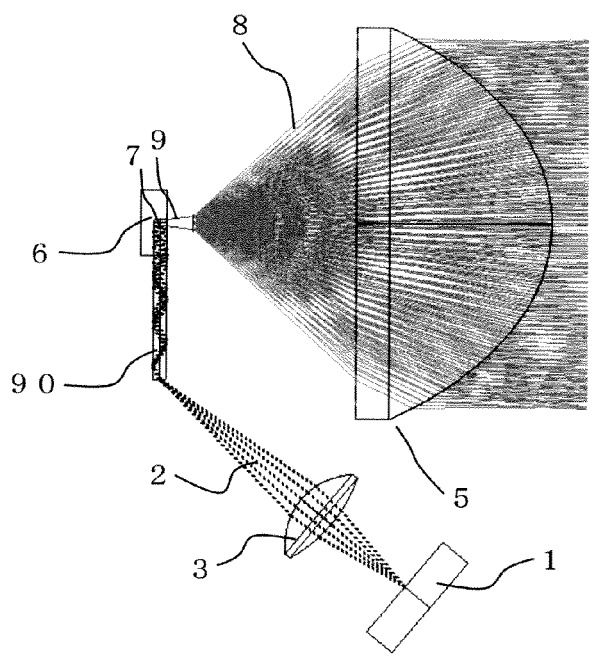
FIGS. 7A to 7D are constitutional diagrams of the main parts of a light source apparatus in Embodiment 4.

FIG. 7A illustrates a whole constitution of the optical system. Exciting light 2 emitted from an exciting light source 1 is converged and enters the incident opening portion of a first optical device (in Embodiment 4, a transmission member 90) by a condenser lens 3. The exciting light 2 which entered the transmission member 90 repeats total reflection in the transmission member 90 and, thereafter, enters a metal member 6. The metal member 6 has a notched portion in the portion to which the exciting light is input, a phosphor 7 to generate phosphor light from the exciting light is coated in the notched portion. The transmission member 90 to guide the exciting light 2 to the phosphor 7 is arranged in the opening portion of one plane in the notched portion to which the exciting light is input. Further, a second optical device (in Embodiment 4, a transmission member 9) having such a taper shape that the outgoing side is larger than the incident side of the phosphor light 8 is arranged in the opening portion of one plane in the notched portion from which the phosphor light 8 is emitted.

Since the exciting light 2 repeats total reflection in the transmission member 90, it becomes a uniform distribution on the outgoing plane of the transmission member. Therefore, the exciting light 2 having the uniform distribution can be irradiated to the phosphor 7 and such a situation that the exciting light is irradiated to one point can be alleviated. Since the phosphor light 8 emitted from the phosphor 7 repeats total reflection in the transmission member 9, it does not diverge in every direction but is converged to the divergence of the predetermined angle in the outgoing opening portion of the transmission member 9 and all of the phosphor light 8 can be captured by the condenser lens 5. The phosphor light 8 emitted from the phosphor 7 passes through the condenser lens 5, thereafter, becomes mostly parallel light, and enters the illumination optical system at the post stage.

In FIG. 13, since the organic silicon resin or the like is used as a binder adapted to disperse and solidify the phosphor, it is necessary to rotate it in order to prevent burning that is caused by temperature. However, by using the inorganic binder, the rotation of the phosphor is unnecessary.

Figure 7D:
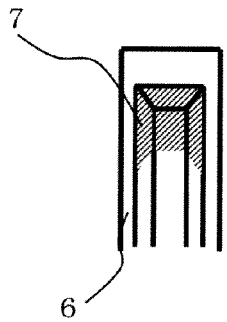
Figure 7B:
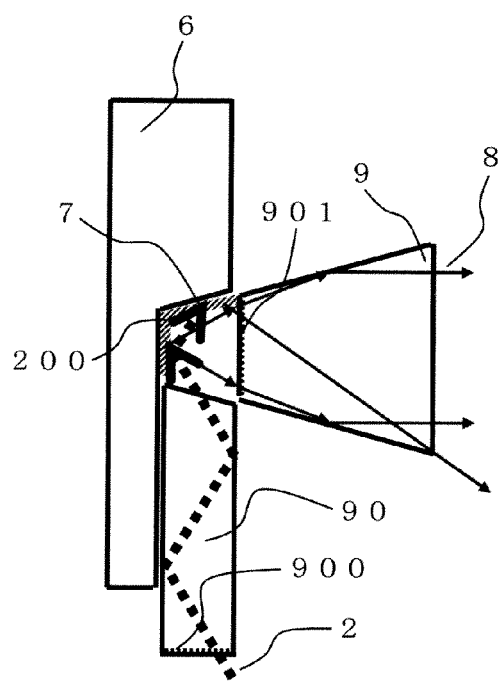

FIG. 7B is an enlarged diagram of the metal member 6 and the transmission members 9 and 90 and shows divergent rays of the phosphor light 8 and the light beam of the exciting light 2.

The dichroic coating 900 having such characteristics that it transmits the light of the wavelength band of the exciting light 2 and reflects the light of the wavelength band of the phosphor light 8 has been evaporated on the incident opening portion of the transmission member 90. A dichroic coating 901 having such characteristics that it reflects the light of the wavelength band of the exciting light 2 and transmits the light of the wavelength band of the phosphor light 8 has been evaporated on the incident opening portion of the transmission member 9. Therefore, in the exciting light 2, the exciting light which enters the transmission member 9 is returned to the notched portion by the dichroic coating 901. In the phosphor light 8, the phosphor light which enters the transmission member 90 is returned to the notched portion by the dichroic coating 900.

Although the dichroic coating has been evaporated on the incident opening portion of each of the transmission members 9 and 90 here, it may be evaporated on the outgoing opening portion. A transmission member to which another dichroic coating has been evaporated as a member different from that of the transmission member may be provided and arranged to the incident side or the outgoing side of each of the transmission members 9 and 90.

Since the phosphor light 8 emitted from the phosphor 7 repeats total reflection in the transmission member 9, the phosphor light 8 does not diverge in every direction but is converged to the divergence of the predetermined angle in the outgoing opening portion of the transmission member 9. In the exciting light 2 which entered the phosphor 7, the non-conversion exciting light 200 which is not converted into the phosphor light is reflected by the phosphor 7, again enters the phosphor 7 coated on another portion, and is converted into the phosphor light 8.

Figure 7C:
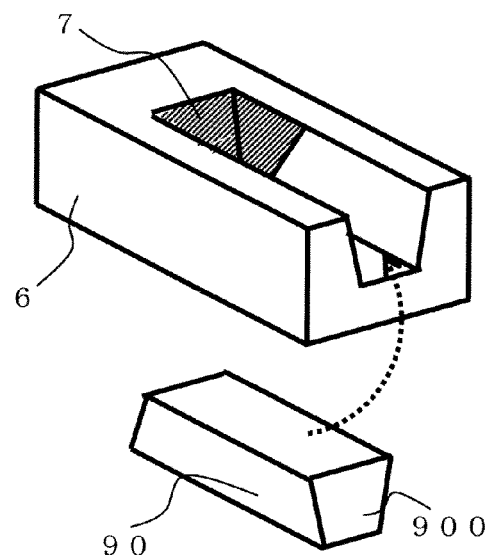

FIG. 7C is a perspective view of the metal member 6 and the transmission member 90. A groove to arrange the transmission member 90 is formed in the metal member 6.

FIG. 7D is a front view of the metal member 6. In this instance, the phosphor has been coated on four surfaces of a front edge of the groove of the notched portion.

It is desirable that the phosphor 7 is coated on at least two surfaces among the four surfaces of the front edge of the groove. This is because if the exciting light 2 entered the two surfaces of the phosphor 7, most of the exciting light is converted into the phosphor light. However, if the number of surfaces which are coated with the phosphor is increased to 3 or 4, the exciting light can be converted into the phosphor light more certainly.

FIG. 8 is a diagram illustrating an optical system of a projection type image display apparatus including the light source apparatus of FIG. 7. First, the principle in which red light and green light are irradiated to liquid crystal type image display devices 19R and 19G at a uniform illuminance will be described.

A blue laser is used as an exciting light source 1. This is because, as for the laser, since the light-emitting area of the light-emitting source is small, it is easy to converge and collimate the light. The exciting light 2 emitted from the exciting light source 1 is converged by the condenser lens 3 as mentioned above, passes through the transmission member 90, thereafter, enters the yellow phosphor (not shown) coated on the notched portion of the metal member 6, and is converted into the yellow phosphor light. A dichroic coating having such characteristics that it reflects blue light and transmits yellow light (green light and red light) has been evaporated on the incident opening portion of the transmission member 9. Therefore, the yellow phosphor light generated by exciting the yellow phosphor repeats total reflection in the transmission member 9 and its divergence angle is reduced. After that, the yellow phosphor light passes through the condenser lens 5, becomes mostly parallel, and enters the polarization conversion integrator.

The polarization conversion integrator includes: the optical integrator which is constituted by a first lens group 10 and a second lens group 11 and performs a uniform illumination; and a polarization converting device 12 of a polarization beam splitter array for aligning the polarizing directions of the light to a predetermined polarizing direction and converting into linear polarized light.

The light from the second lens group 11 is mostly aligned to the predetermined polarizing direction, for example, to the Y polarized light of the linear polarized light by the polarization converting device 12. The projection images of the lens cells of the first lens group 10 are overlaid onto the liquid crystal type image display devices 19R and 19G by the condenser lens 13 and collimator lenses 17R and 17G, respectively. At this time, the yellow phosphor light which passed through the condenser lens 13 is separated into red light and green light by a dichroic mirror 14.

Since the dichroic mirror 14 has such characteristics that it transmits green light and reflects red light, in the yellow light which entered the dichroic mirror 14, the green light passes through the dichroic mirror 14, is reflected by a reflecting mirror 15, and becomes mostly parallel by the collimator lens 17G. X polarized light is eliminated by an incident side polarizing plate 18G and, thereafter, the green light enters the liquid crystal type image display device 19G. On the other hand, the red light is reflected by the dichroic mirror 14, is reflected by a reflecting mirror 16, and becomes mostly parallel by the collimator lens 17R. The X polarized light is eliminated by the incident side polarizing plate 18R and, thereafter, the red light enters the liquid crystal type image display device 19R.

Subsequently, the principle in which the blue light is irradiated to a liquid crystal type image display device 19B at a uniform illuminance will be described.

The light source 23 is a blue light source and is, for example, an LED light source. Blue light emitted from the light source 23 passes through the collimator lenses 24 and 25, thereafter, becomes mostly parallel, and enters the polarization conversion integrator for the blue light.

The polarization conversion integrator for the blue light includes: an optical integrator which is constituted by a third lens group 26 and a fourth lens group 27 and performs a uniform illumination; and a polarization converting device 28 of a polarization beam splitter array for aligning the polarizing directions of the light to the predetermined polarizing direction and converting into a linear polarized light. The light from the fourth lens group 27 is mostly aligned to a predetermined polarizing direction, for example, to the Y polarized light of the linear polarized light by the polarization converting device 28. The projection images of the lens cells of the third lens group 26 are overlaid onto the liquid crystal type image display device 19B by a condenser lens 29, reflecting mirror 30, and collimator lens 17B, respectively. At this time, the X polarized light is eliminated by an incident side polarizing plate 18B.

Subsequently, the polarization degree of each liquid crystal type image display device 19 (19R, 19G, 19B) constituting the light intensity modulating unit is raised by the incident side polarizing plate 18 (18R, 18G, 18B) in which the Y direction is set to the transmission axis. The light intensity modulating unit performs a light intensity modulation in accordance with color image signals (not shown) and forms the optical image of the X polarization of each color light.

The optical image of the X polarization of each color light formed as mentioned above enters outgoing side polarizing plates 20 (20R, 20G, 20B). The outgoing side polarizing plates 20R, 20G, and 20B are polarizing plates in which the X direction is set to the transmission axis. Thus, unnecessary polarized light component (in this instance, the Y polarized light) is eliminated and the contrast is raised.

The optical image of the Y polarization of each color light formed as mentioned above enters a color synthesizing prism 21 as a color synthesizing means. At this time, the optical image of the green light enters as X polarization (P polarization to the dichroic film surface of the color synthesizing prism 21) as it is. On the other hand, in the blue optical path and the red optical path, a ½λ plate (not shown) is provided between each of the outgoing side polarizing plate 20B and 20R and the color synthesizing prism 21. Therefore, the optical images of the blue light and the red light of the X polarization are converted into the optical images of the Y polarization (S polarization to the dichroic film surface of the color synthesizing prism 21 where the color synthesis is performed) and, thereafter, enter the color synthesizing prism 21, respectively. This is because by performing what is called the SPS synthesis in which the green light is set to the P polarized light and the red light and the blue light are set to the S polarized light in consideration of the spectral characteristics of the dichroic film, it is intended to efficiently perform the color synthesis.

Subsequently, the color synthesizing prism 21 is constituted in such a manner that the dichroic film (dielectric multilayer film) for reflecting blue light and the dichroic film (dielectric multilayer film) for reflecting red light are formed on the interfaces of the four rectangular prisms in the almost X-character shape (cross shape). The blue light and the red light (S polarization to the dichroic film surface) which entered the opposite incident planes among the three incident planes of the color synthesizing prism 21 are respectively reflected by the dichroic film for blue light and the dichroic film for red light which cross each other. The green light (P polarization to the dichroic film surface) which entered the center incident plane goes straight. The optical images of the respective color light are synthesized, so that a color image light (synthesized light) is emitted from the outgoing plane.

The synthesized light emitted from the color synthesizing prism 21 is projected onto a screen (not shown) of the transmission type or the projection type by a projecting lens 22 like, for example, a zoom lens, thereby displaying an enlargedly projected image.

[Embodiment 5]

FIGS. 9A to 9D are constitutional diagrams of a main part of an optical system of a light source apparatus in Embodiment 5.

Figure 9A:
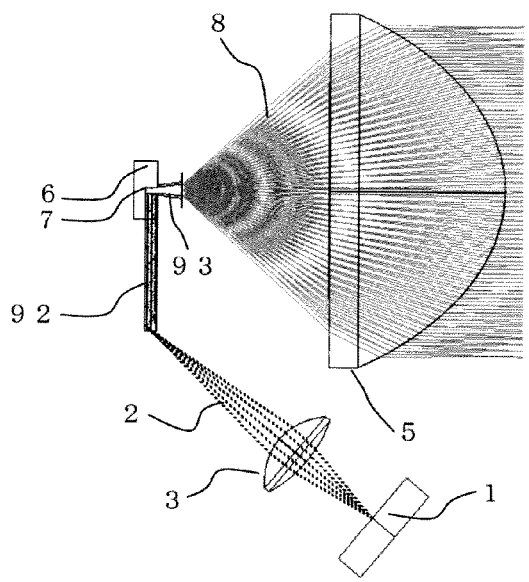
FIGS. 9A to 9D are constitutional diagrams of the main parts of a light source apparatus in Embodiment 5.

FIG. 9A illustrates a whole constitution of the optical system and mainly differs from Embodiment 4 with respect to the point that the first optical device and the second optical device are replaced by multiple reflecting devices 92 and 93, respectively.

The exciting light 2 emitted from the exciting light source 1 is converged and enters the incident opening portion of the multiple reflecting device 92 by the condenser lens 3. The exciting light 2 which entered the multiple reflecting device 92 repeats reflection in the multiple reflecting device 92 and, thereafter, enters a metal member 6. The metal member 6 has a notched portion in the portion to which the exciting light is input, a phosphor 7 to generate the phosphor light from the exciting light is coated in the notched portion. The multiple reflecting device to guide the exciting light 2 to the phosphor 7 is arranged in the opening portion of one plane in the notched portion to which the exciting light 2 is input. Further, the multiple reflecting device 93 having such a taper shape that the outgoing side is larger than the incident side of the phosphor light 8 is arranged in the opening portion of one plane in the notched portion from which the phosphor light 8 is emitted.

Since the exciting light 2 repeats reflection in the multiple reflecting device 92, it becomes a uniform distribution on the outgoing plane of the multiple reflecting device. Therefore, the exciting light 2 having the uniform distribution can be irradiated to the phosphor 7 and such a situation that the exciting light is irradiated to one point can be alleviated. Since the phosphor light 8 emitted from the phosphor 7 repeats reflection in the multiple reflecting device 93, it does not diverge in every direction but is converged to the divergence of the predetermined angle in the outgoing opening portion of the multiple reflecting device 93 and all of the phosphor light 8 can be captured by a condenser lens 5. The phosphor light 8 emitted from the phosphor 7 passes through the condenser lens 5, thereafter, becomes mostly parallel light, and enters the illumination optical system at the post stage.

Figure 9D:
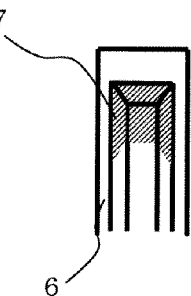
Figure 9B:
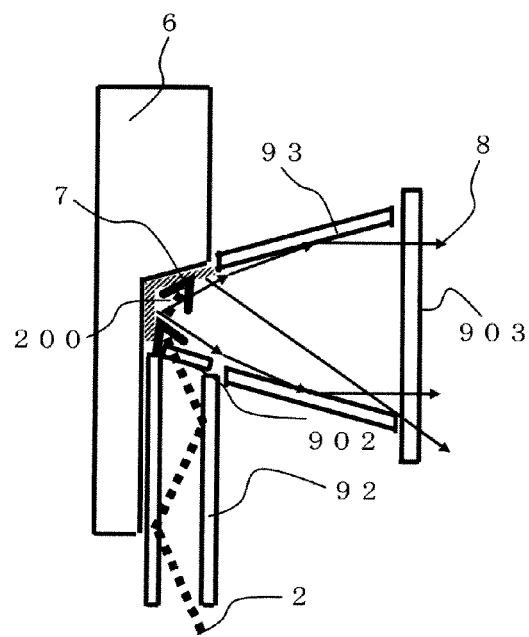

FIG. 9B is an enlarged diagram of the metal member 6 and the multiple reflecting devices 92 and 93 and shows divergent rays of the phosphor light 8 and the light beam of the exciting light 2.

A dichroic filter 902 to which a dichroic coating, having such characteristics that it transmits the light of the wavelength band of the exciting light 2 and reflects the light of the wavelength band of the phosphor light 8, has been evaporated is arranged in the outgoing opening portion of the multiple reflecting device 92. A dichroic filter 903 to which a dichroic coating, having such characteristics that it reflects the light of the wavelength band of the exciting light 2 and transmits the light of the wavelength band of the phosphor light 8, has been evaporated is arranged in the outgoing opening portion of the multiple reflecting device 93. The multiple reflecting device is a hollow device in which a reflecting film has been evaporated on the inner surface, and the coating cannot be performed on the opening surface. Therefore, the dichroic filter as a separate member is used.

In the exciting light 2, the exciting light which enters the multiple reflecting device 93 is returned to the metal notched portion by the dichroic coating 903. In the phosphor light 8, the phosphor light which enters the multiple reflecting device 92 is returned to the metal notched portion. Although the dichroic filters 902 and 903 have been arranged in the outgoing opening portions of the multiple reflecting devices here, they may be arranged in the incident opening portions. Although the dichroic filter 902 is not described in Embodiment 4, the dichroic filter 902 can be also applied to Embodiment 4 in a manner similar to Embodiment 5.

Since the phosphor light 8 emitted from the phosphor 7 repeats reflection in the multiple reflecting device 93, the phosphor light 8 does not diverge in every direction but is converged to the divergence of the predetermined angle in the outgoing opening portion of the multiple reflecting device 93.

In a manner similar to FIG. 7C, non-conversion exciting light 200 is reflected by the phosphor 7, again enters the phosphor 7 coated on another portion, and is converted into the phosphor light 8.

Figure 9C:
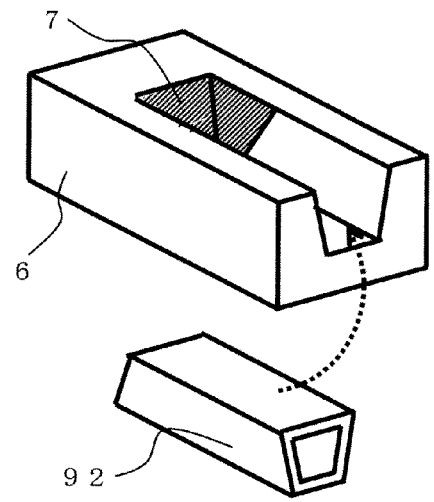

FIG. 9C is a perspective view of the metal member 6 and the multiple reflecting device 92. A groove to arrange the multiple reflecting device 92 is formed in the metal member 6.

FIG. 9D is a front view of the metal member 6. Since the description here is similar to that of FIG. 7D, its description is omitted.

Figure 10:
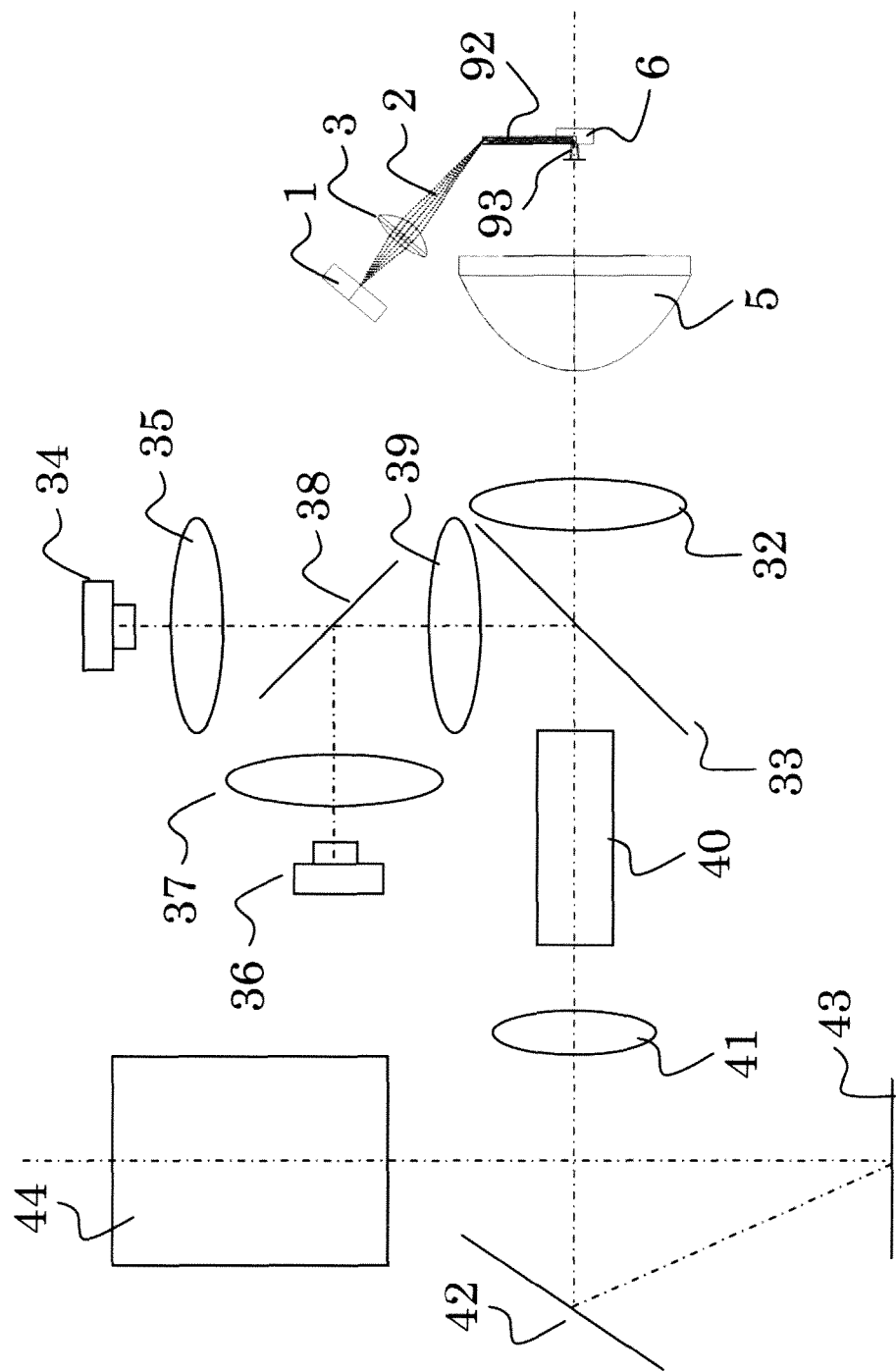
FIG. 10 is a diagram illustrating an optical system of a projection type image display apparatus in Embodiment 5.

FIG. 10 is a diagram illustrating an optical system of a projection type image display apparatus including the light source apparatus of FIGS. 9A to 9D.

A blue laser is used as an exciting light source 1. This is because, as for the laser, since the light-emitting area of the light-emitting source is small, it is easy to converge and collimate the light. The blue exciting light 2 emitted from the exciting light source 1 is converged by the condenser lens 3 as mentioned above, passes through the multiple reflecting device 92, thereafter, enters a green phosphor (not shown) coated on the notched portion of the metal member 6, and is converted into green phosphor light. The green phosphor light generated by exciting the green phosphor repeats reflection in the multiple reflecting device 93 and its divergence angle is reduced. After that, the green phosphor light passes through the condenser lens 5, becomes mostly parallel, passes through a condenser lens 32, and enters a dichroic mirror 33. The dichroic mirror 33 has such characteristics that it transmits green light and reflects red light and blue light. Therefore, the green light passes through the dichroic mirror 33 and enters the multiple reflecting device 40. The curvature of the condenser lens 32 is set so that the mostly parallel light which entered is converged to an incident opening portion of the multiple reflecting device 40.

The light source 34 is a red light source and is, for example, an LED light source. The red light emitted from the light source 34 becomes parallel by a collimator lens 35 and enters a dichroic mirror 38. The dichroic mirror 38 has such characteristics that it transmits red light and reflects blue light. Therefore, the red light passes through the dichroic mirror 38, passes through the condenser lens 39, and enters the dichroic mirror 33.

On the other hand, the light source 36 is a blue light source and is, for example, an LED light source. Blue light emitted from the light source 36 becomes parallel by a collimator lens 37 and enters the dichroic mirror 38. The dichroic mirror 38 has such characteristics that it transmits red light and reflects blue light. Therefore, the blue light is reflected by the dichroic mirror 38, passes through the condenser lens 39, and enters the dichroic mirror 33. The dichroic mirror 33 has such characteristics that it transmits green light and reflects red light and blue light. Therefore, the red light and the blue light which entered the dichroic mirror 33 are reflected by the dichroic mirror 33 and enters the multiple reflecting device 40.

The curvature of the condenser lens 39 is set so that the mostly parallel light which entered is converged to the incident opening portion of the multiple reflecting device 40. The red light, green light, and blue light which entered the multiple reflecting device 40 are reflected a plurality of times in the multiple reflecting device 40 and become light having a uniform illuminance distribution on the outgoing opening surface of the multiple reflecting device 40. The shape of the outgoing opening surface of the multiple reflecting device 40 is almost similar to that of a DMD device 43. The curvature of the condenser lens 41 is set so that the image formed on the outgoing opening surface of the multiple reflecting device 40 is enlargedly formed on the DMD device 43. Therefore, the red light, green light, and blue light emitted from the outgoing opening surface of the multiple reflecting device 40 pass through the condenser lens 41, are reflected by the reflecting mirror 42, and thereafter, are irradiated onto the DMD device 43 at a uniform illuminance distribution.

The exciting light source 1, light source 34, and light source 36 are solid-state light-emitting devices of the high response speed and can be time-divisionally controlled. Therefore, each color light is time-divisionally modulated every color light by the DMD device 43. Each color light reflected by the DMD device 43 enters a projecting lens 44 and is enlargedly projected onto a screen (not shown).

[Embodiment 6]

FIGS. 11A to 11D are constitutional diagrams of a main part of a light source apparatus in Embodiment 6.

Embodiment 6 mainly differs from Embodiment 5 with respect to the point that the dichroic coating is not evaporated on a transmission member 9 and a surface 70 which is not coated with a phosphor 7 exists in the notched portion of a metal member 6.

Figure 11A:
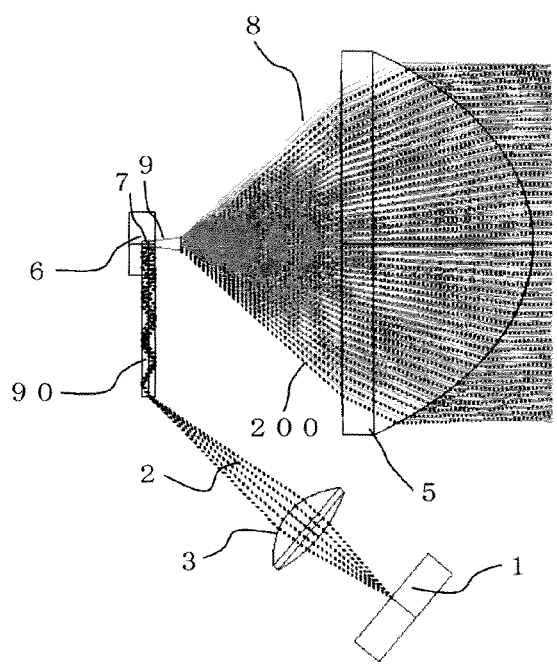
FIGS. 11A to 11D are constitutional diagrams of the main parts of a light source apparatus in Embodiment 6.
Figure 11D:
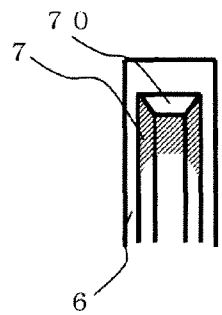

FIG. 11A illustrates a whole constitution of an optical system. The exciting light 2 emitted from an exciting light source 1 is converged and enters the incident opening portion of a transmission member 90 by a condenser lens 3. The exciting light 2 which entered the transmission member 90 repeats total reflection in the transmission member 90 and, thereafter, enters the metal member 6. The metal member 6 has a notched portion in the portion to which the exciting light is input, a phosphor 7 to form the phosphor light from the exciting light is coated in the notched portion. Phosphor light 8 emitted from the phosphor 7 passes through a condenser lens 5, thereafter, becomes mostly parallel light, and enters the illumination optical system at the post stage. The surface which is not coated with the phosphor 7 exists in the notched portion of the metal member 6. The non-conversion exciting light 200 which is not converted into the phosphor light enters the transmission member 9, passes through the condenser lens 5, thereafter, becomes mostly parallel light, and enters the illumination optical system at the post stage in a manner similar to the phosphor 7.

Figure 11B:
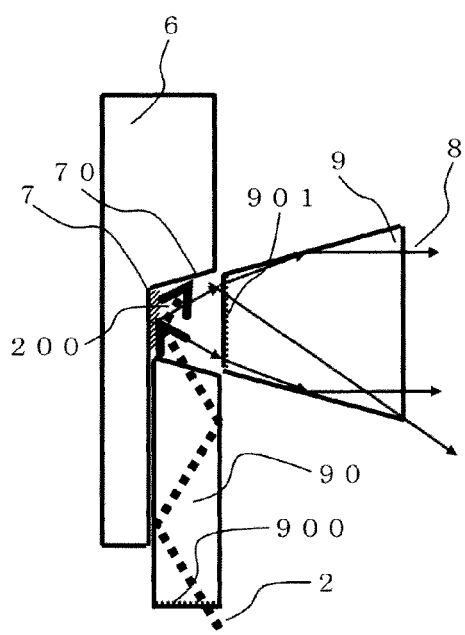

FIG. 11B is an enlarged diagram of the metal member 6 and the transmission members 9 and 90 and shows divergent rays of the phosphor light 8 and the light beam of the exciting light 2.

The dichroic coating 900 having such characteristics that it transmits the light of the wavelength band of the exciting light 2 and reflects the light of the wavelength band of the phosphor light 8 has been evaporated on the incident opening portion of the transmission member 90. Therefore, the exciting light 2 passes through the transmission member 90 and enters the phosphor 7. Since the phosphor light 8 emitted from the phosphor 7 repeats total reflection in the transmission member 9, the phosphor light 8 does not diverge in every direction but is converged to the divergence of the predetermined angle in the opening portion of the transmission member 9. Although the dichroic coating has been evaporated on the incident opening portion of the transmission member 90 here, it may be evaporated on the outgoing opening portion. Another transmission member which is different from the transmission member and to which the dichroic coating has been evaporated may be provided and arranged on the incident side or the outgoing side of the transmission member 90.

The surface 70 which is not coated with the phosphor 7 exists in the notched portion of the metal member 6. Therefore, since the non-conversion exciting light 200 which was reflected by the phosphor non-coated surface 70 and entered the transmission member 9 and the non-conversion exciting light 200 which entered directly the transmission member 9 repeat total reflection in the transmission member 9, they do not diverge in every direction but are converged to the divergence of a predetermined angle in the opening portion of the transmission member 9. Since the dichroic coating is not evaporated on the transmission member 9, the non-conversion exciting light 200 is not returned in the direction of the metal member 6.

Figure 11C:
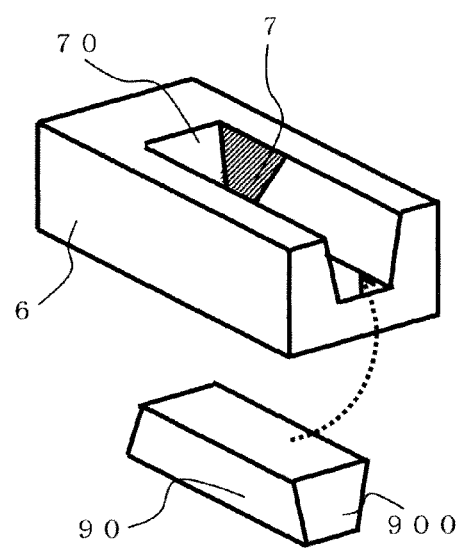

FIG. 11C is a perspective view of the metal member 6 and the transmission member 90. FIG. 5D is a front view of the metal member 6. A groove to arrange the transmission member 90 is formed in the metal member 6. As mentioned above, the surface 70 which is not coated with the phosphor 7 exists in at least one surface among the four surfaces of the front edge of the groove.

Figure 12:
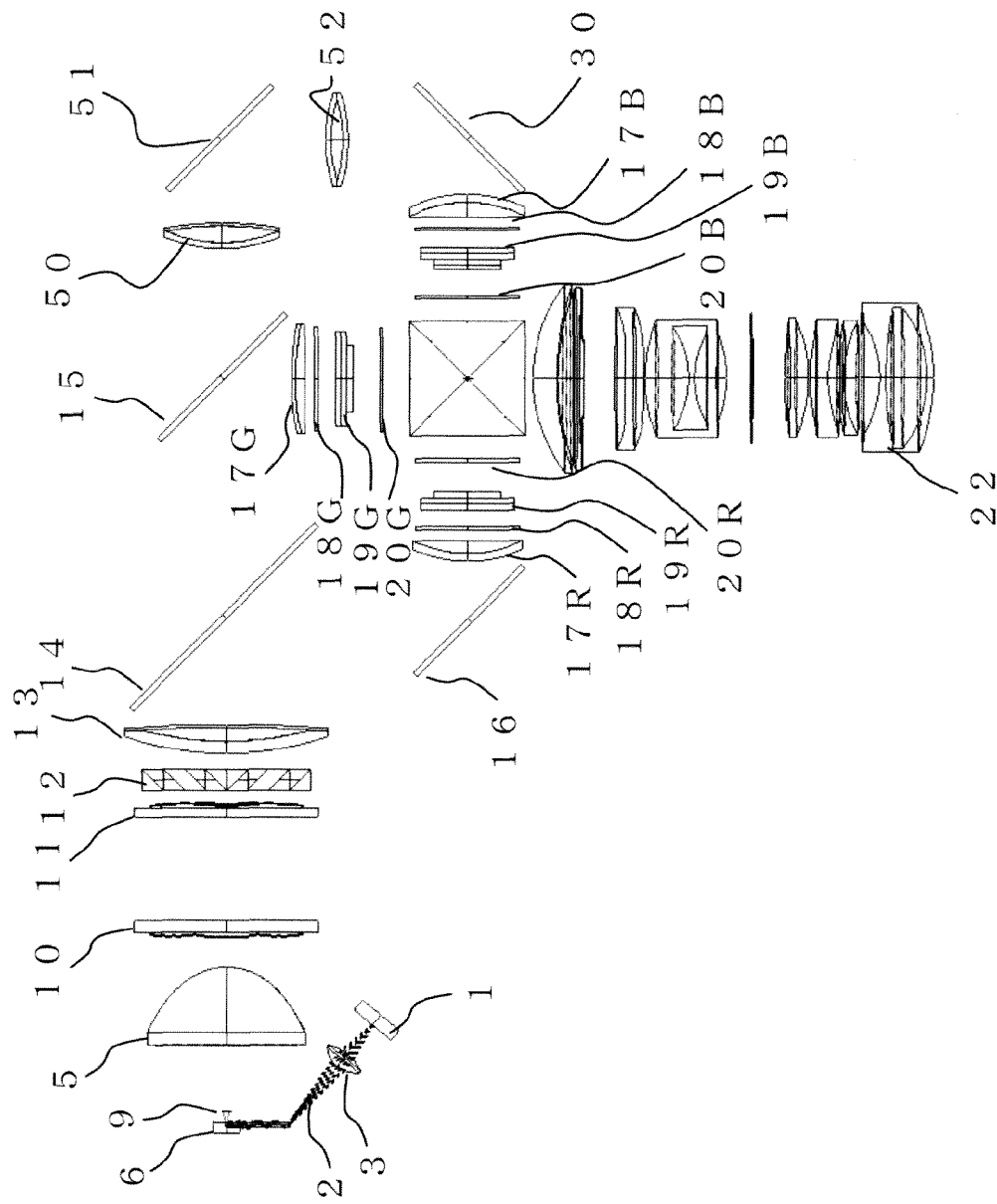
FIG. 12 is a diagram illustrating an optical system of a projection type image display apparatus in Embodiment 6.

FIG. 12 is a diagram illustrating an optical system of a projection type image display apparatus including the light source apparatus of FIGS. 11A to 11D. When elements arranged on the optical path of each color light are distinguished, R, G, or B showing the color light is added as a suffix after each reference numeral. If there is no need to distinguish them, each suffix of the color light is omitted.

Since the principle in which the red light and the green light are irradiated to liquid crystal type image display devices 19R and 19G at a uniform illuminance is substantially the same as that in Embodiment 4, it is omitted.

First, the principle in which the blue light is irradiated to a liquid crystal type image display device 19B at a uniform illuminance will be described. A blue laser is used as a blue light source in a manner similar to the exciting light source 1. This is because, as for the laser, since the light-emitting area of the light-emitting source is small, it is easy to converge and collimate the light. The blue exciting light 2 emitted from the exciting light source 1 passes through the transmission member 90 as mentioned above and, thereafter, enters a yellow phosphor (not shown) coated on the notched portion of the metal member 6. A part of the blue exciting light 2 is converted to yellow phosphor light and a part of the blue exciting light 2 enters the transmission member 9 as non-conversion blue exciting light. The yellow phosphor light and the non-conversion blue exciting light repeat total reflection in the transmission member 9, a divergence angle is reduced, thereafter, those light pass through the condenser lens 5, become mostly parallel, and enter a polarization conversion integrator.

The polarization conversion integrator includes: the optical integrator which is constituted by a first lens group 10 and a second lens group 11 and performs a uniform illumination; and a polarization converting device 12 of the polarization beam splitter array for aligning the polarizing directions of the light to a predetermined polarizing direction and converting into the linear polarized light. The light from the second lens group 11 is mostly aligned to the predetermined polarizing direction, for example, to the Y polarized light of the linear polarized light by the polarization converting device 12. In the yellow phosphor light and the non-conversion blue exciting light which entered the polarization conversion integrator, the projection images of the respective lens cells of the first lens group 10 by the non-conversion blue exciting light pass through a condenser lens 13, dichroic mirror 14, and dichroic mirror 15 and, thereafter, are overlaid to a portion near a condenser lens 50. The light flux having a uniform illuminance distribution which was overlaid near the condenser lens 50 passes through a reflecting mirror 51, a condenser lens 52, a reflecting mirror 30, and a collimator lens 17B and, thereafter, is projected as a light flux having a uniform illuminance distribution onto a liquid crystal type image display device 19B. At this time, the X polarized light is eliminated by an incident side polarizing plate 18B.

Since the principle after the liquid crystal type image display device 19R, 19G, and 19B is substantially the same as that in Embodiment 4, it is omitted.

The characteristics of the dichroic mirror 14 have been set to the reflection of red light and the transmission of green light and blue light and the characteristics of the dichroic mirror 15 have been set to the reflection of green light and the transmission of blue light here. However, the characteristics of the dichroic mirror 14 may be set to the reflection of blue light and the transmission of green light and red light and the characteristics of the dichroic mirror 15 may be set to the reflection of green light and the transmission of red light here.

In Embodiments 4 and 6, the transmission members are used as both of (1) a device for guiding the exciting light 2 to the phosphor 7 and (2) a device having the taper shape which is provided for the opening portion of one plane from which the phosphor light 8 is emitted. In Embodiment 5, the multiple reflecting devices are used as both of such devices. However, the following combinations are considered. That is, there are four kinds of combinations: (1) the transmission member and (2) the transmission member (Embodiments 4 and 6); (1) the transmission member and (2) the multiple reflecting device; (1) the multiple reflecting device and (2) the transmission member; and (1) the multiple reflecting device and (2) the multiple reflecting device (Embodiment 5).

Further, since there is waterproof phosphor among the phosphor, a hydrophobic coating may be evaporated on the upper surface of the phosphor. Further, if the exciting light of the P polarization is input to the phosphor in order to reduce the reflection of the exciting light in the phosphor, improvement of the efficiency can be expected.

Although Embodiments 1 to 6 have been described on the assumption that the image display device is either the liquid crystal type image display device or the DMD device, naturally, the invention can be realized even by using any of those devices in any of Embodiments. Although there is Embodiment using one exciting light source 1, a plurality of exciting light sources may be arranged.

It should be further understood by those skilled in the art that although the foregoing description has been made on embodiments of the invention, the invention is not limited thereto and various changes and modifications may be made without departing from the spirit of the invention and the scope of the appended claims.

According to the invention, in the light source apparatus in which the light is emitted from the phosphor by the exciting light, the light source apparatus in which the brightness efficiency has been improved can be provided.

The invention claimed is:
1. A light source apparatus comprising:
a light source which emits exciting light;
a dichroic mirror which reflects said exciting light;
a condenser lens which converges the reflected exciting light;
a metal member to receive said converged exciting light to generate phosphor light; and
an optical device to guide the converged exciting light converged by said condenser lens to said metal member, and to transmit the phosphor light from said metal member to said condenser lens, wherein:
said generated phosphor light passes through said condenser lens, thereby becoming mostly parallel phosphor light by said condenser lens,
said dichroic mirror has a characteristic to reflect said exciting light and to transmit said mostly parallel phosphor light,
said exciting light enters the dichroic mirror as mostly parallel light,
said exciting light is transmitted to said metal member through said optical device by lens action of said condenser lens,
said metal member has a concave portion in a portion where said transmitted exciting light is received, and phosphor to generate said phosphor light from said transmitted exciting light is coated in said concave portion, said optical device is arranged at a portion where said phosphor light generated in said concave portion is emitted and has a taper shape which is narrowed toward the said metal member, the phosphor light from the metal member being reflected a plurality of times within the taper shaped optical device to form diffused phosphor light, the progressively diffused phosphor light is introduced to said condenser lens, and a width of light flux of the phosphor light which exits from said condenser lens and passes through said dichroic mirror is wider than a width of the light flux of the exciting light which is reflected by said dichroic mirror and enters said condenser lens.

2. A projection type image display apparatus comprising:
a light source which emits exciting light;
a dichroic mirror which reflects said exciting light;
a condenser lens which converges the reflected exciting light;
a metal member to which said converged exciting light is input; and
an optical device to guide said converged exciting light converged by said condenser lens to said metal member and to transmit phosphor light generated in said metal member to said condenser lens, wherein:

said generated phosphor light passes through said condenser lens, thereby becoming mostly parallel phosphor light by said condenser lens, said dichroic mirror has a characteristic to reflect said exciting light and to transmit said mostly parallel phosphor light, said exciting light enters the dichroic mirror as mostly parallel light, said converged exciting light is transmitted to said metal member through said optical device by lens action of said condenser lens, said metal member has a concave portion in a portion to which said transmitted exciting light is input, and phosphor to generate said phosphor light from said transmitted exciting light is coated in said concave portion, said optical device is arranged at a portion where said phosphor light generated in said concave portion is emitted and has a taper shape which is narrowed toward the said metal member, the phosphor light from the metal member is reflected a plurality of times within the taper shaped optical device to form diffused phosphor light, the progressively diffused phosphor light is introduced to said condenser lens, and a width of light flux of the phosphor light which exits from said condenser lens and passes through said dichroic mirror is wider than a width of the light flux of the exciting light which is reflected by said dichroic mirror and enters said condenser lens.

\* \* \* \* \*